(12) United States Patent  
Snyder

(10) Patent No.: US 7,669,928 B2  
(45) Date of Patent: Mar. 2, 2010

(54) ADJUSTABLE THIGH SUPPORT FOR AUTOMOBILE SEAT VIA ADJUSTMENT PLATE

(75) Inventor: Melinda Snyder, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 199 days.

(21) Appl. No.: 11/962,859

(22) Filed: Dec. 21, 2007

(65) Prior Publication Data

US 2008/0157578 A1 Jul. 3, 2008

Related U.S. Application Data

(60) Provisional application No. 60/878,361, filed on Dec. 31, 2006.

(51) Int. Cl.
*A47C 3/00* (2006.01)
*A47C 7/00* (2006.01)

(52) U.S. Cl. ............................. 297/284.11; 297/283.2

(58) Field of Classification Search ............ 297/284.11, 297/283.2
See application file for complete search history.

(56) References Cited

U.S. PATENT DOCUMENTS

| | | | | |
|---|---|---|---|---|
| 4,018,477 | A | * | 4/1977 | Hogan .................... 297/284.11 |
| 4,334,709 | A | | 6/1982 | Akiyama et al. |
| 4,629,248 | A | | 12/1986 | Mawbey |
| 5,366,272 | A | | 11/1994 | Lebrun |
| 5,588,708 | A | * | 12/1996 | Rykken et al. ........... 297/423.2 |
| 6,419,317 | B1 | | 7/2002 | Westrich et al. |
| 6,454,353 | B1 | | 9/2002 | Knaus |
| 6,601,918 | B2 | | 8/2003 | Mattsson |
| 6,705,675 | B1 | | 3/2004 | Eastman et al. |
| 6,857,700 | B2 | | 2/2005 | Eastman et al. |
| 6,926,361 | B2 | | 8/2005 | Link |
| 7,104,609 | B2 | * | 9/2006 | Kim ....................... 297/411.35 |
| 7,108,322 | B2 | * | 9/2006 | Erker ..................... 297/284.11 |
| 7,229,134 | B2 | * | 6/2007 | Ito ......................... 297/423.26 |

FOREIGN PATENT DOCUMENTS

JP 06284940 A * 10/1994

OTHER PUBLICATIONS

Peter, John, Toyota's Most American Sedan Finds Its Rightful Place at the Head of the Family Table, Automotive Industries Magazine (Mar. 2005).

* cited by examiner

*Primary Examiner*—Sarah B McPartlin
(74) *Attorney, Agent, or Firm*—Mark E. Duell, Esq.; Emerson, Thomson + Bennett

(57) ABSTRACT

A vehicle seat having an adjustable thigh support, the vehicle seat comprising an adjustable thigh-support component, wherein the component is an adjustment plate that is moveable in the fore and aft directions of the vehicle; and wherein the adjustment plate is positioned generally toward the front edge of the seat; a motor-driven vertical power screw for rotatably moving the adjustment plate in the fore and aft direction of the vehicle, wherein tile seat length is increased when the screw rotatably causes the adjustment plate to move in the fore direction of the vehicle, and wherein the seat length is decreased when the screw rotatably causes the adjustment plate to move in the aft direction of the vehicle; and a seat cushion having an underside that contacts at least a portion of the front face of the adjustment plate, wherein the surface area of the seat-cushion underside that contacts the front face of the adjustment plate varies as a function of the adjust-plate position.

19 Claims, 5 Drawing Sheets

ADJUSTABLE THIGH SUPPORT FOR AUTOMOBILE SEAT VIA ADJUSTMENT PLATE

BACKGROUND OF THE INVENTION

1. Field of the Invention

Embodiments are directed to an automobile seat having an adjustable thigh support.

2. Description of Related Art

Traditional automobile seats have a generally horizontal seat base and a seatback coupled to the seat base at an obtuse angle for supporting an occupant of the automobile in a seated posture. The occupant of the automobile sits, facing a forward direction, upon a cushion provided to pad the seat base with his feet resting on the floor and his legs extending outward beyond the cushion. The seat can optionally be provided with a mechanism for horizontally adjusting the position of the seat relative to the floor of the automobile, as well as a mechanism for adjusting the angle between the seatback and the seat base.

A tall occupant having long legs will typically adjust the seat position toward the rear of the automobile to enlarge the leg room between a front portion of the seat cushion and a forward barrier of the automobile cabin. Doing so allows the tall occupant to extend his legs as much as possible to enhance his comfort while riding in the automobile. By extending his legs, the tall occupant also allows his thighs to rest somewhat flat on the seat cushion, thereby providing support to the tall occupant's thighs. However, the longitudinal length of conventional seat cushions is insufficient to extend beneath the entire length of the tall occupant's thighs, causing them to extend unsupported beyond a front portion of the seat cushion.

Similarly, an automobile seat tailored to provide thigh support to a tall occupant causes discomfort to a short vehicle occupant. In such cases, the longitudinal length of the seat cushion extends too far forward beneath the short occupant's thighs and even beneath the knee of the short occupant. Thus, while seated, the short occupant can-not bend his legs at a suitable angle to allow his feet to rest on the floor of the automobile's cabin.

Previous attempts to devise a vehicular seat to accommodate occupants of varying heights have focused on allowing adjustment of the longitudinal length of the seat cushion. To this end, the front portions of said seats have been made adjustable, independent of the remainder of the at cushion. The occupant can manually adjust the position of the front portion relative to the seat cushion, thereby providing thigh support where needed. However, such a configuration leaves a gap between the adjustable front portion and the rest of the seat cushion, making the occupant uncomfortable while seated in the seat.

Other attempts have focused on allowing adjustment of the seat cushion as a whole, undivided structure. Such configurations allow for rotation of the front portion about an axis such that said rotation elevates or lowers the front portion of the seat cushion as desired. Although this does provide support to the occupant's thighs, it limits the occupant's ability to extend his legs (i.e., establish an angle between the thigh and calf to an angle approaching 180°) while still allowing his feet to rest on the floor of the automobile's cabin.

Accordingly, there is a need in the art for a vehicular seat having an adjustable thigh support that is easy to use and accommodates occupants having varying thigh lengths.

BRIEF SUMMARY OF THE INVENTION

An embodiment provides a vehicle seat having an adjustable thigh support, the vehicle seat comprising an adjustable thigh-support component, wherein the component is an adjustment plate that is moveable in the fore and aft directions of the vehicle; and wherein the adjustment plate is positioned generally toward the front edge of the seat; a motor-driven vertical power screw for rotatably moving the adjustment plate in the fore and aft direction of the vehicle, wherein the seat length is increased when the screw rotatably causes the adjustment plate to move in the fore direction of the vehicle, and wherein the seat length is decreased when the screw rotatably causes the adjustment plate to move in the aft direction of the vehicle; and a seat cushion having an underside that contacts at least a portion of the front face of the adjustment plate, wherein the surface area of the seat-cushion underside that contacts the front face of the adjustment plate varies as a function of the adjust-plate position.

An additional embodiment is directed to a method for providing adjustable thigh support in a vehicle seat, the method comprising providing adjustable thigh support by altering the longitudinal length of a vehicle seat by varying the longitudinal position of an adjustment plate within the vehicle seat.

Another embodiment provides for a vehicle seat having an adjustable thigh support, the vehicle seat comprising an adjustment plate that is moveable in the fore and aft directions of the vehicle; wherein the adjustment plate is positioned generally toward the front edge of the seat; and wherein the longitudinal length of the vehicle seat relatively increases or relatively decreases as the adjustment plate respectively moves in the fore or aft direction.

BRIEF DESCRIPTION OF THE DRAWINGS

The invention may take physical form in certain parts and arrangement of parts, embodiments of which will be described in detail in this specification and illustrated in the accompanying drawings that form a part hereof and wherein.

DETAILED DESCRIPTION OF ILLUSTRATIVE EMBODIMENTS

Figure 1:
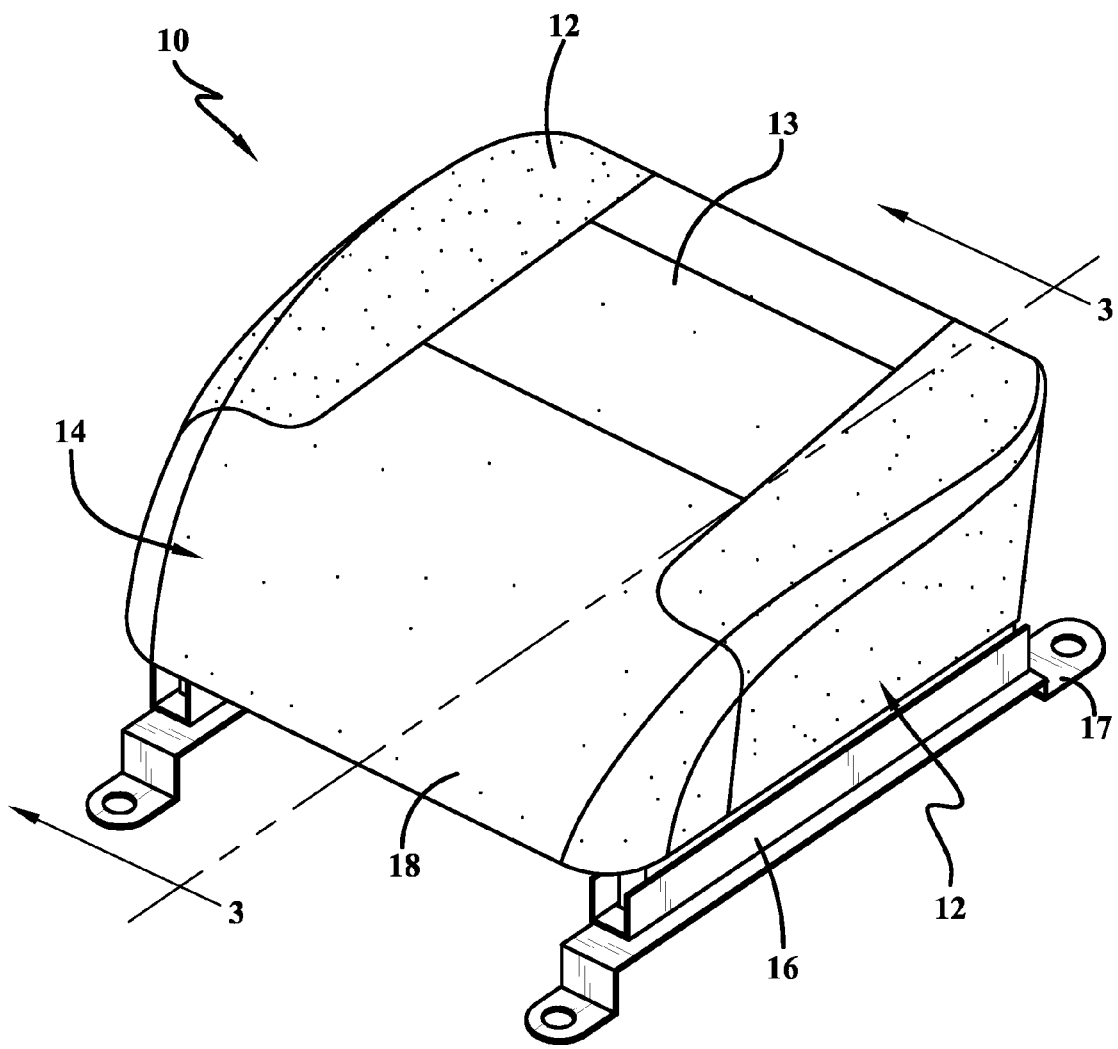
FIG. 1 is a perspective view of an automotive seat having an adjustable thigh support wherein the adjustable thigh support is in the fully retracted position.

Certain terminology is used herein for convenience only and is not to be taken as a limitation on the embodiments provided herein. Relative language used herein is best understood with reference to the drawings, in which like numerals are used to identify like or similar items. Further, in the drawings, certain features may be shown in somewhat schematic form.

FIG. 1 shows a vehicle seat 10 for insertion into a vehicle wherein the vehicle seat 10 has an adjustable thigh-support component, i.e. adjustment plate 22 (not shown), in the fully retracted position. An embodiment provides for vehicle seat 10 having bolsters 12 on either side of vehicle seat cushion 13. Bolsters 12 act as non-adjustable perimeter thigh-support components and extend from a substantially rear portion of vehicle seat 10 to a substantially front-edge of seat 14 portion of vehicle seat 10. In an embodiment, bolsters 12 extend from the rear portion of vehicle seat 10 to a distance that is less than about 40% away from the front edge of seat 14. An embodiment provides for front edge of seat 14 to be fully covered by trim cover 18. Trim cover 18 overlays and in some embodiments is fixedly attached to a subsurface foam pad 20 (not shown). The useful surface area of the adjustable thigh support varies as a function of the longitudinal positioning of adjustment plate 22 (not shown) in its continuously variable positions ranging from fully retracted (presently shown) to fully extended (shown in FIG. 2). Vehicle seat 10 can have cushion side frames 16 on either side of vehicle seat 10 and positioned substantially underneath bolsters 12. Cushion side frames 16 functionally permit the continuously variable positioning of vehicle seat 10 in both the fore and aft directions of the vehicle, wherein the continuously variable positioning is understood as a range of positions relative to where mounting bracket 17 is fixedly attached within a vehicle cabin. Figurative line 3 shown as longitudinally positioned along vehicle seat 10 represents a cross-sectional plane that is further illustrated in FIG. 3. As front edge of seat 14 extends in the fore direction of the cabin (as a result of adjustment plate 22 (not shown) extending in the fore direction), useful surface area increases for thigh support and an embodiment provides for a motorized power source 28 for moving front edge of seat 14 in the fore and aft directions of the vehicle cabin via the adjustment plate.

Cushion side frame 16 can be any general rigid structure that can provide mounting support to cushion portions of vehicle seat 10. According to some embodiments, the cushion side frame comprises a rail and track system. However, one of skill in the art will recognize that any of a variety of systems can be appropriate for positioning the seat. In an embodiment, cushion side frame 16 can support the weight of a vehicle seat 10 and an occupant that weighs up to 300 pounds; an alternate embodiment provides for cushion side frame 16 being able to provide support for approximately half the weight of a vehicle seat 10 and an occupant that weighs up to 250 pounds. Embodiments provide for vehicle seat 10 having at least one cushion side frame 16, and although shown in FIG. 1 as having two cushion side frames 16, the vehicle seat 10 is not intended to be limited by the number of cushion side frames 16 used to construct vehicle seat 10.

Although illustrated in FIG. 1 as having two side bolsters 12, embodiments for vehicle seat 10 include embodiments with two side bolsters as well as embodiments without side bolsters 12. The longitudinal length of side bolster 12 on a vehicle seat 10 is in no way intended to be a limitation on vehicle seat 10 having an adjustable thigh-support component.

Figure 2:
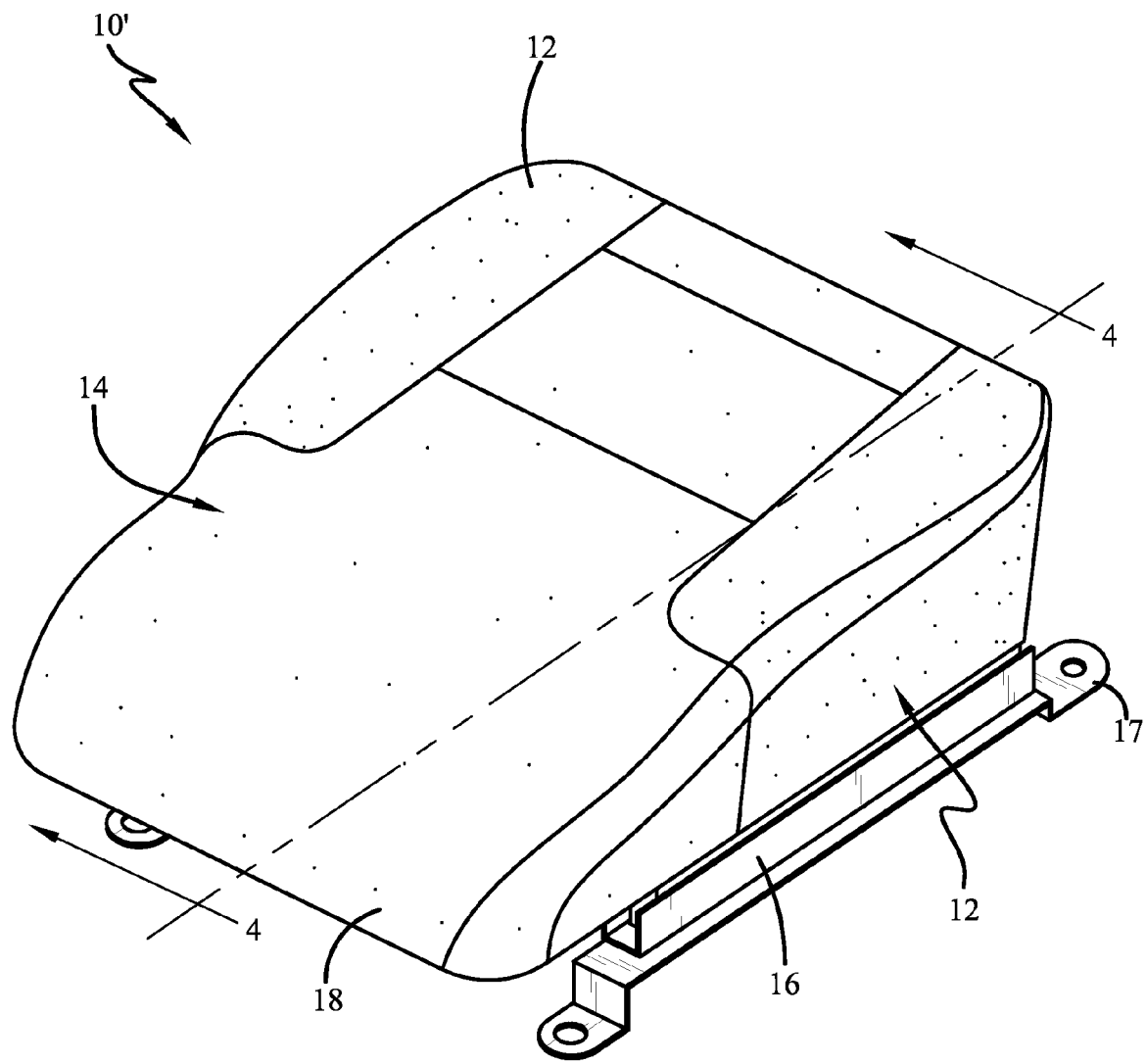
FIG. 2 is a perspective view of an automotive seat having an adjustable thigh support wherein the adjustable thigh support is in the fully extended position

FIG. 2 shows vehicle seat 10' wherein vehicle seat 10' illustrates an embodiment wherein an adjustable thigh-support component (adjustment plate 22 (not shown)) is in the fully extended position and therefore front edge of seat 14 is positioned at a distance that is relatively more remote from bolsters 12 than front edge of seat 14 in FIG. 1, which shows front edge of seat 14 in the fully retracted position. FIGS. 1 and 2 show positioning of front edge of seat 14 respectfully in the fully retracted and fully extended positions. As adjustment plate 22 extends and retracts respectively in the fore and aft directions, front edge of seat 14 figuratively extends and retracts in a corresponding fashion.

Although the front edge of seat 14 is described herein as extending or retracting as a function of the relative position of the adjustment plate 22, it should be understood that as the adjustment plate 22 extends outwardly from the fully retracted position, the foam pad 20 and trim cover 18 effectively uncurl from the front-end portion of seat 10 in order to accommodate the position of the extending adjustment plate 22. Further, as adjustment plate 22 retracts from an extended position, foam pad 20 and trim cover 18 effectively curl down the front face of adjustment plate 22.

Figure 3:
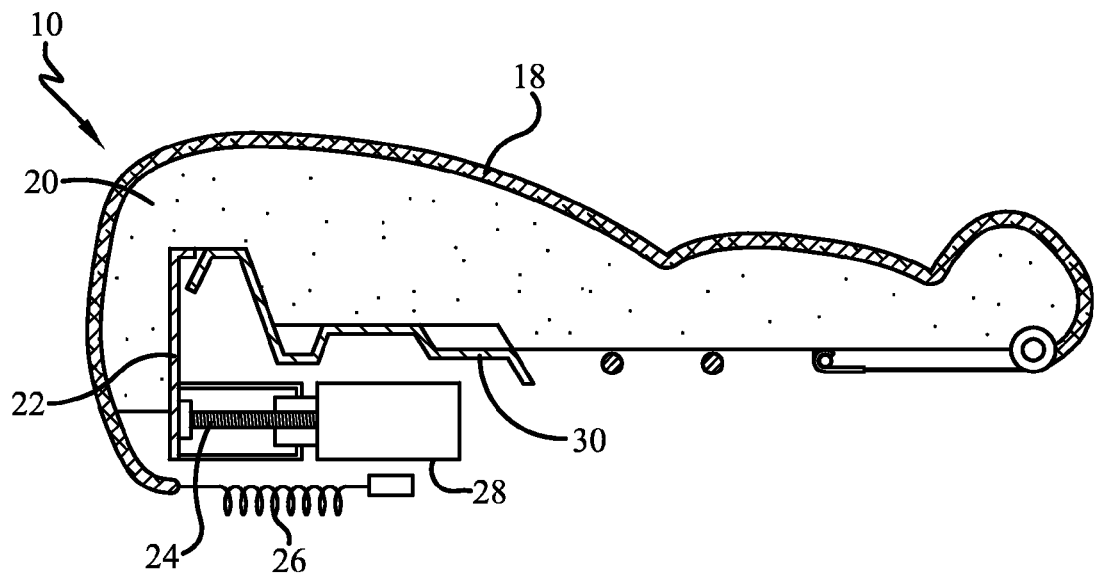
FIG. 3 is a cross-sectional side view of an automotive seat having an adjustable thigh support wherein the adjustable thigh support is in the fully retracted position.

FIG. 3 shows a longitudinal cross-sectional view 3, 3 of vehicle seat 10 wherein the adjustable thigh support is in the fully retracted position. The longitudinal cross-sectional view shows trim cover 18 extending along the entire perimeter of the occupant-useful portions of the vehicle seat. At the front-end portions of vehicle seat 10, trim cover 18 is fixedly attached to trim cover spring 26 located beneath the motor for vertical power screw 28. One of skill in the art will recognize that a variety of elastic means can be appropriate alternatives to the spring 26. The positioning, quantity and material composition of trim cover spring(s) 26 is not intended as a limitation on the design of vehicle seat 10 having an adjustable thigh support. A person of ordinary skill in the art will be able to arrive at useful positions for trim cover spring 26 without undue experimentation.

With further regard to FIG. 3, vertical power screw 24 is powered by motor for vertical power screw 28. Motor for vertical power screw 28 can rotate vertical power screw 24 and both clockwise and counter clockwise rotations. As vertical power screw 24 is rotated by motor for vertical power screw 28 in either the clockwise or counter clockwise directions, adjustment plate 22 is either extended or retracted in the horizontal position. Vertical power screw 24 is not limited by a power screw design having specifically left-handed or right-handed threading elements, and both threading embodiments are useful. There is also no limitation on the rate of rotation that motor for vertical power screw 28 can rotate vertical power screw 24. Useful rate of rotation is a function of threading on vertical power screw 24, and persons of ordinary skill in the art can determine useful rates for rotation based upon vertical power screw 24 threading without having to exercise undo experimentation. Alternate embodiments provide for using pneumatic or hydraulic power sources to extend or retract adjustment plate 22.

Notably, FIGS. 2 and 3 show the vertical motor and trim cover spring attached to a bracket that connects to the cushion side frames. However, this design is merely exemplary and not limiting. One of skill in the art will recognize that the motor and spring can be attached by any of a wide variety of acceptable means including, without limitation, brackets differing from those of FIGS. 2 and 3 in position and/or construction, or to the cushion pan. Location and attachment of these components are not intended to be limiting.

Trim cover spring 26 is necessary to keep pressure on foam pad 20 to thereby ensure contact between the portion of foam pad 20 positioned at front edge of seat and adjustment plate 22. As adjustment plate 22 extends in the fore direction of vehicle seat 10, foam pad 20 of fixed length reduces the amount of surface area of foam pad 20 in contact with adjustment plate 22. Foam pad 20 has a maximum surface area in contact with adjustment plate 22 when adjustment plate 22 is in the fully retracted position as shown in FIG. 3. As adjustment plate 22 moves in the horizontal fore direction of vehicle seat 10, the front-edge portion of foam pad 20 slideably moves in the upwards vertical direction along the face of adjustment plate 22 thereby decreasing the surface area in contact with the adjustment plate.

Figure 4:
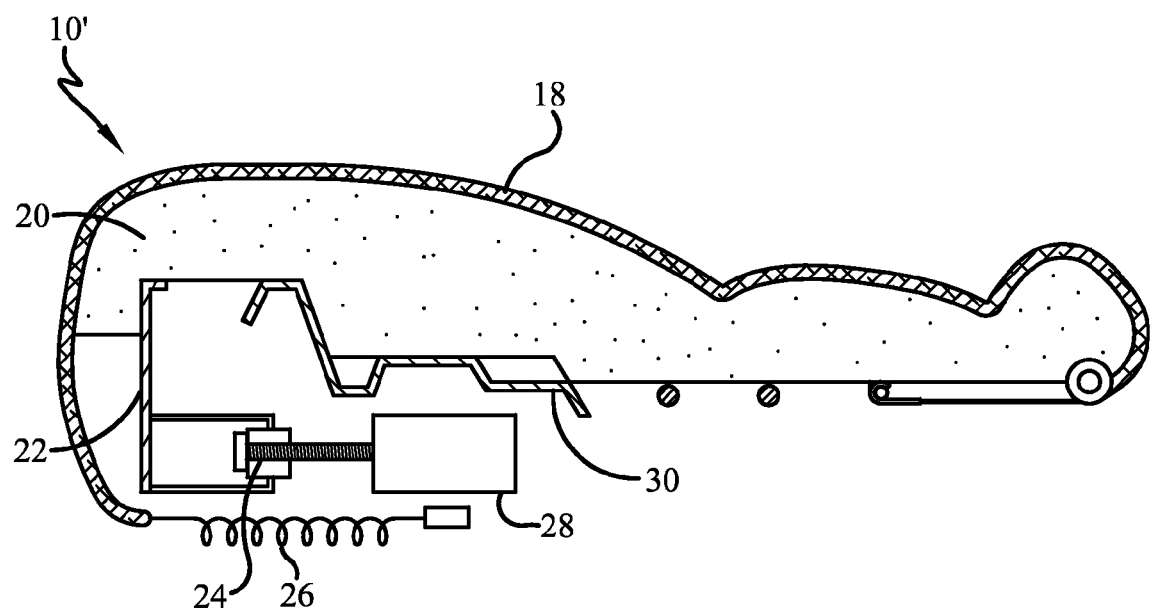
FIG. 4 is a cross-sectional side view of an automotive seat having an adjustable thigh support wherein the adjustable thigh support is in the fully extended position.

FIG. 4 shows an embodiment of vehicle seat 10' wherein adjustment plate 22 is in the fully extended position and therefore the least amount of surface area of front end portion of foam pad 20 is in contact with adjustment plate 22. Stated differently, the surface area of front end portion of foam pad 20 that is in contact with adjustment plate 22 is a function of the longitudinal positioning of adjustment plate 22, as adjustment plate 22 moves in the longitudinal fore direction, the amount of foam-pad 20 surface area in contact with the face of adjustment plate 22 decreases. Furthermore, the amount of foam-pad 20 surface area in contact with adjustment plate 22 increases as adjustment plate 22 moves in the longitudinal aft direction of the vehicle seat. An embodiment provides that pad 20 is not made out of foam, but instead is made of any other known useful material that can act as a cushion for a vehicle seat. Cushion pan 30 provides underside support for foam pad 20. An embodiment as illustrated in both FIG. 3 and FIG. 4 illustrates cushion pan 30 as being fixedly positioned within the underside of vehicle seat 10 and 10'. Vehicle seat 10 and 10' are in no way intended to be limited by the illustrated positioning of cushion pan 30, and alternate embodiments known in the art for positioning cushion pan 30 can be employed. The vehicle seat 10 and 10' having adjustable thigh support can use any motor known to be useful for rotating vertical power screw 28, or a similar screw type. Persons of ordinary skill in the art can select useful motors for turning vertical power screw 28 without having to exercise undo experimentation during the selection.

Figure 5:
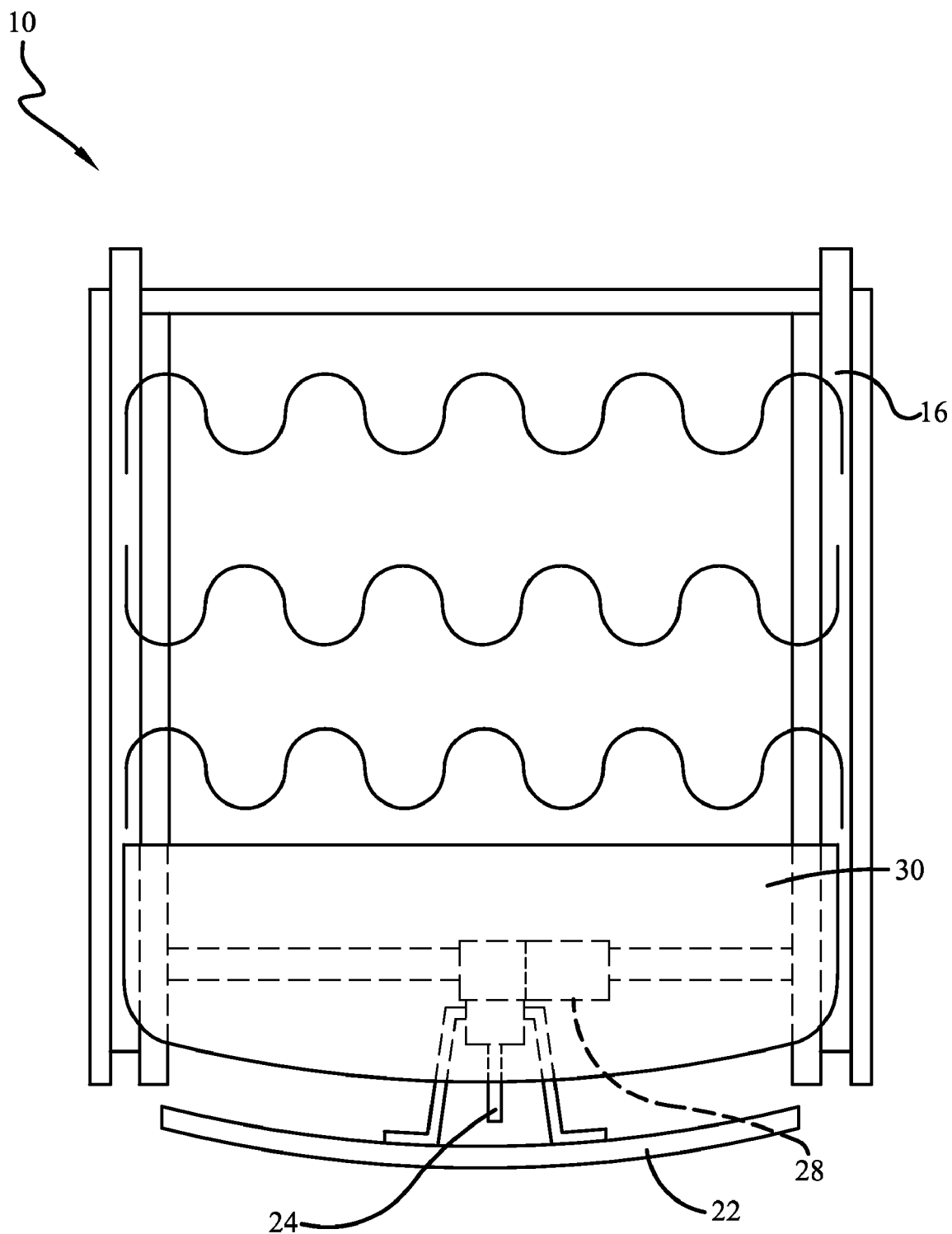
FIG. 5 is a top view of an automotive seat having an adjustable thigh support wherein the adjustable thigh support is in the fully retracted position.

FIG. 5 is a top view of vehicle seat 10 having an adjustable thigh support in the fully retracted position. Cushion side frame 16 is shown as positioned on either side of vehicle seat 10 in the longitudinal direction of the vehicle seat. Cushion side frames 16 are shown as running substantially parallel to each other and such an orientation is well known to facilitate seat adjustment in the fore and aft directions of the vehicle. Cushion pan 30 is shown as being positioned proximate to the front-end portion of vehicle seat 10, wherein the dashed phantom lines illustrate an embodiment for the positioning of the motor for vertical power screw 28 as well as the positioning of vertical power screw 24 relative to cushion pan 30. An embodiment provides for motor 28 to be mounted to the seat cushion frame to control the fore/aft adjustment of the adjustment plate 22. Adjustment plate 22 will slide forward by a power operated control. Vehicle seat cushion 13 will remain in a relatively fixed position, and forward motion of the adjustment plate 22 will cause the foam pad 20 and trim cover 18 to uncurl or slide in the upward vertical direction of the adjustment plate, and forward motion of the adjustment plate also simultaneously causes the lengthening of the vehicle seat 10 in the longitudinal direction. Trim cover 18 will be attached under the seat to trim cover spring 26 that will allow trim cover 18 to remain tight during fore/aft movement of adjustment plate 22. FIG. 5 shows adjustment plate 22 having an arc shape, and this illustrated arc shape is not intended as a limiting embodiment, and alternate useful shapes of adjustment plate 22 can be employed.

An embodiment provides for adjustable thigh support extension or cushion extension by adjustment plate 22 movement being a separate seat function than an overall power-seat slide function. Variable positioning of adjustment plate 22 will allow occupant/user to uncurl and increase length of cushion 13 to their preference and allow more support on their thighs, while maintaining uniform-cushion appearance and feeling.

Figure 6:
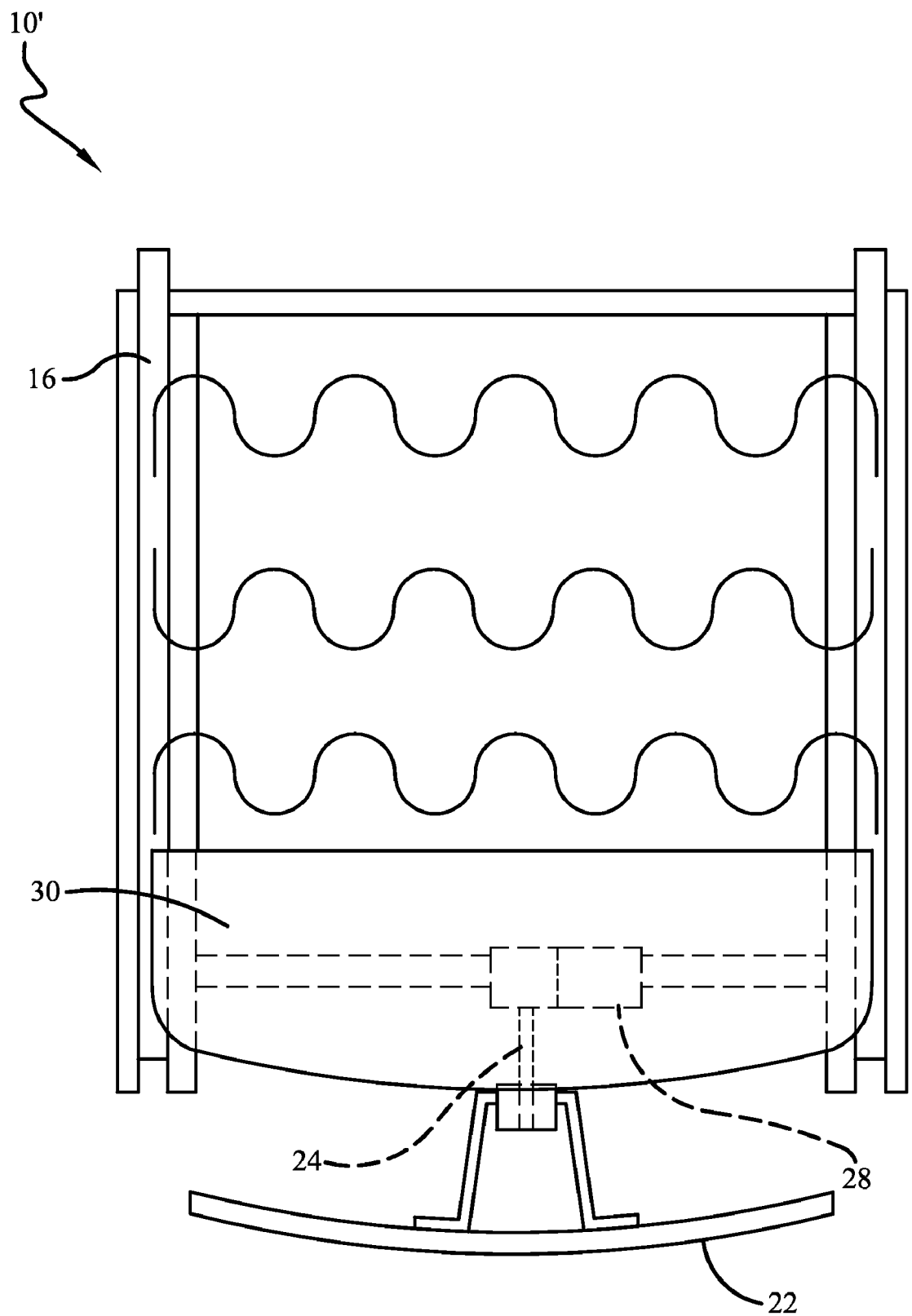
FIG. 6 is a top view of an automotive seat having an adjustable thigh support wherein the adjustable thigh support is in the fully extended position.

FIG. 6 illustrates a top view of vehicle seat 10' wherein the adjustable thigh support is fully extended due to the fully extended position of adjustment plate 22.

Illustrative embodiments have been described, hereinabove. It will be apparent to those skilled in the art that the above devices and methods may incorporate changes and modifications without departing from the general scope of this invention. It is intended to include all such modifications and alterations in so far as they come within the scope of the appended claims.

What is claimed is:

1. A thigh support adjustment mechanism, comprising:
 a cushion pan having a top face, a bottom face, and a front edge, the top face being adapted to receive a seat cushion in a supporting relation and the front edge adapted to face in a forward direction when installed in a vehicle seat;
 an adjustment plate having a front face and a back face, the front face being adapted to face in a forward direction when installed in a vehicle seat, and the adjustment plate being disposed forward of the front edge of the cushion pan and adapted to be movably adjustable in at least a forward direction and a backward direction relative to the cushion pan;
 a vertical power screw drivingly engaging the back face of the adjustment plate, the vertical power screw being adapted to drive the adjustment plate in at least a forward direction relative to the cushion pan; and
 a motor drivingly connected to the vertical power screw and adapted to drive the screw in forward and backward directions relative to the cushion pan;
 wherein the adjustment plate movably adjusts in only a substantially linear direction and maintains rotational orientation with respect to the cushion pan during adjustment in the forward and backward directions;
 wherein the seat cushion has an underside that contacts at least a portion of the front face of the adjustment plate, wherein a surface area of the seat-cushion underside that contacts the front face of the adjustment plate varies as a function of the adjustment plate position;
 wherein the surface area of the seat cushion underside that contacts the front face of the adjustment plate decreases as the adjustment plate moves in the fore direction, and wherein the surface area of the seat cushion underside that contacts the front face of the adjustment plate increases as the adjustment plate moves in the aft direction.

2. The mechanism of claim 1, further comprising at least one trim cover spring having at least two ends including a forward end and a backward end, the forward end being connectable to at least one forward component of a vehicle seat and the trim cover spring being adapted to pull the at least one forward component toward the cushion pan when the vertical adjustment screw is adjusted in a backward direction.

3. The mechanism of claim 2, wherein the at least one trim cover spring comprises a plurality of trim cover springs.

4. The mechanism of claim 2, wherein the at least one forward component includes a trim cover of a vehicle seat.

5. The mechanism of claim 1, further comprising at least one trim cover spring having at least two ends including a forward end and a backward end, the forward end being connectable to at least one forward component of a vehicle seat and the trim cover spring being adapted to apply a force to the at least one forward component, the force being directed way from the cushion pail.

6. The mechanism of claim 5, wherein driving the vertical power screw in a forward direction applies a compressive force to the at least one trim cover spring, and driving the vertical power screw in a backward direction removes the compressive force from the at least one trim cover spring.

7. The mechanism of claim 1, wherein the vertical power screw is attached to the back face of the adjustment plate and the vertical power screw being adapted to drive the adjustment plate in forward direction and in a backward direction.

8. The mechanism of claim 1, further comprising a trim cover.

9. The trim cover of claim 8, wherein the trim cover defines a seat surface adapted to receive a human occupant.

10. The trim cover of claim 9, wherein the seat surface lengthens when the vertical power screw drives in a forward direction, and shortens when the vertical power screw drives in a backward direction.

11. The trim cover of claim 10, wherein the trim cover defines a continuous seat surface and does not form a gap in the seat surface when the vertical power screw is driven in a forward direction.

12. The mechanism of claim 1, wherein the vertical power screw drives in only a substantially horizontal direction, and wherein the adjustment plate movably adjusts in only a substantially horizontal direction.

13. The mechanism of claim 1, wherein the adjustment plate has an arc shape extending along a width of the seat cushion.

14. The mechanism of claim 1, further comprising:
a pair of bolsters located on either side of the seat cushion, the pair of bolsters extending from a rear portion of the seat cushion to at least a mid-portion of the seat cushion, wherein the pair of bolsters remain stationary when the adjustment plate movably adjusts in at least the forward direction and the backward direction relative to the cushion pan.

15. A vehicle seat having an adjustable thigh support, the vehicle seat comprising:

an adjustable thigh-support component, wherein the component comprises an adjustment plate that is moveable in fore and aft directions of the vehicle; and
wherein the adjustment plate is positioned generally toward a front edge of the seat;
a motor-driven vertical power screw for rotatably moving the adjustment plate in the fore and aft direction of the vehicle, wherein a seat length is increased when the screw rotatably causes the adjustment plate to move in the fore direction of the vehicle, and wherein the seat length is decreased when the screw rotatably causes the adjustment plate to move in the aft direction of the vehicle; and
a seat cushion having an underside that contacts at least a portion of the front face of the adjustment plate, wherein a surface area of the seat-cushion underside that contacts the front face of the adjustment plate varies as a function of the adjustment plate position;
wherein the surface area of the seat cushion underside that contacts the front face of the adjustment plate decreases as the adjustment plate moves in the fore direction; and
wherein the surface area of the seat cushion underside that contacts the front face of the adjustment plate increases as the adjustment plate moves in the aft direction.

16. The vehicle seat of claim 15, further comprising a trim cover spring that is fixedly attached to the seat trim cover, wherein the spring maintains tension on the seat trim cover as a function of the position of the adjustment plate.

17. The vehicle seat of claim 15, wherein the vehicle seat comprises an automobile seat.

18. The vehicle seat of claim 15, wherein the adjustment plate has an arc shape extending along the width of the seat cushion.

19. The vehicle seat of claim 15, further comprising:
a pair of bolsters located on either side of the seat cushion, the pair of bolsters extending from a rear portion of the seat cushion to at least a mid-portion of the seat cushion, wherein the pair of bolsters remains stationary when the seat length is increased and decreased.

* * * * *